(12) United States Patent
Patel et al.

(10) Patent No.: US 8,694,570 B2
(45) Date of Patent: Apr. 8, 2014

(54) METHOD AND APPARATUS FOR EVALUATION OF MULTI-DIMENSIONAL DISCRETE FOURIER TRANSFORMS

(76) Inventors: Arun Mohanlal Patel, Toronto (CA); Paul Chow, Mississauga (CA)

(*) Notice: Subject to any disclaimer, the term of this patent is extended or adjusted under 35 U.S.C. 154(b) by 1052 days.

(21) Appl. No.: 12/694,747

(22) Filed: Jan. 27, 2010

(65) Prior Publication Data

US 2010/0191791 A1    Jul. 29, 2010

Related U.S. Application Data

(60) Provisional application No. 61/206,098, filed on Jan. 28, 2009.

(51) Int. Cl.
*G06F 17/10*    (2006.01)

(52) U.S. Cl.
USPC ............................................. 708/401; 708/403

(58) Field of Classification Search
USPC .......................................... 708/401, 403, 405
See application file for complete search history.

(56) References Cited

U.S. PATENT DOCUMENTS

| | | | | |
|---|---|---|---|---|
| 4,821,224 | A * | 4/1989 | Liu et al. ....................... | 708/401 |
| 7,788,310 | B2 * | 8/2010 | Eleftheriou et al. ........... | 708/401 |
| 8,095,585 | B2 * | 1/2012 | Bhanot et al. .................. | 708/401 |
| 2002/0065862 | A1 * | 5/2002 | Nakanishi ...................... | 708/401 |
| 2010/0106759 | A1 * | 4/2010 | Chen et al. ..................... | 708/404 |

* cited by examiner

*Primary Examiner* — Chuong D Ngo

(57) ABSTRACT

A device and method for evaluating multidimensional discrete Fourier transforms (DFT) by eliminating transpose operations by transforming every dimension concurrently. At least one computing node is enabled to evaluate a DFT of one of a multidimensional input data set and a subgroup of the input data set, wherein the subgroup comprises groupings of elements taken from a plurality of selected dimensions of the input data set for subsequent multidimensional DFT operations.

18 Claims, 13 Drawing Sheets

```
                                    #200
for (depth = (order-1); depth >= 0; depth--)
{
    for (dim = (NUM_DIMENSIONS-1); dim >= 0; dim--)
    {
        inner_bound = (1 << (depth + (order * dim)));
        outer_increment = inner_bound << 1;

for (outer_loop = 0; outer_loop < NUM_ELEMENTS;
             outer_loop += outer_increment)
        {
            idx_a = outer_loop;
            idx_b = outer_loop | inner_bound;

for (inner_loop = 0; inner_loop < inner_bound; inner_loop++)
            {
                complex a, b;

a = p_mem_array[idx_a];
                b = p_mem_array[idx_b];

p_mem_array[idx_a] = a+b;
                p_mem_array[idx_b] = a-b;

idx_a++;
                idx_b++;
            }
        }
    }

// Complex rotations
    if (depth != 0)
    {
        complex_rotate(depth, p_lattice_mem, fft_direction);
    }
}
```

Figure 2

```
                                    #201
depth_mask = (1 << depth);

for (z = 0; z < NUM_DIM_POINTS; z++)
{
    int z_cf_idx = (z & depth_mask) ? (z & (depth_mask-1)) : 0;

for (y = 0; y < NUM_DIM_POINTS; y++)
    {
        int y_cf_idx = (y & depth_mask) ? (y & (depth_mask-1)) : 0;

for (x = 0; x < NUM_DIM_POINTS; x++)
        {
            int cf_idx = (x & depth_mask) ? (x & (depth_mask-1)) : 0;
            cf_idx += (y_cf_idx + z_cf_idx);
            cf_idx &= ((depth_mask<<1)-1);
            cf_idx <<= (LOG_MAX_DIMENSIONS-depth);

p_cf_array[z][y][x] = cf_table[cf_idx];
        }
    }
}
```

Figure 3

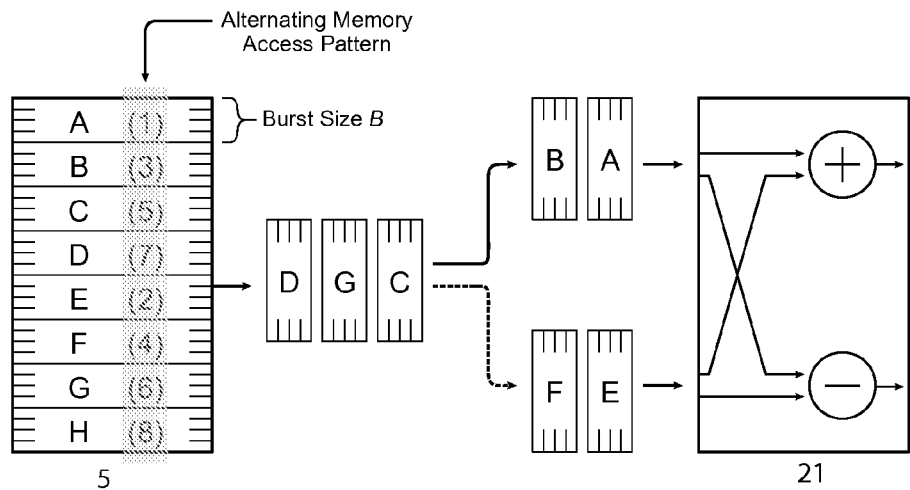
Alternating Memory Access
Pattern for $\Delta A > B$
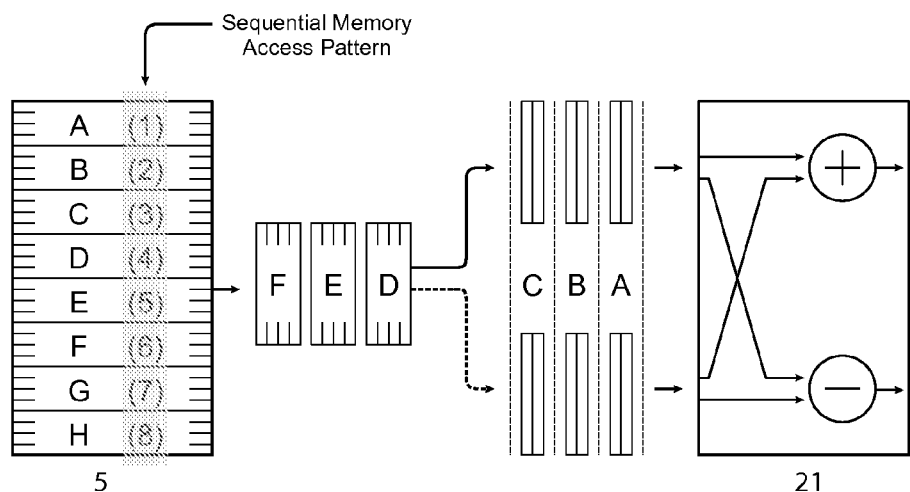
Sequential Memory Access
Pattern for $\Delta A \leq B$
Figure 9

| | $a_{14}$ | $a_{13}$ | $a_{12}$ | $a_{11}$ | $a_{10}$ | $a_9$ | $a_8$ | $a_7$ | $a_6$ | $a_5$ | $a_4$ | $a_3$ | $a_2$ | $a_1$ | $a_0$ | |
| Stage | $b_{11}$ | $b_{10}$ | $b_9$ | $b_8$ | $b_7$ | $b_6$ | $b_5$ | $b_4$ | $b_3$ | $b_2$ | $b_1$ | $b_0$ | $e_2$ | $e_1$ | $e_0$ | Alt/Seq |
|---|---|---|---|---|---|---|---|---|---|---|---|---|---|---|---|---|
| 5:Z | x | $c_{13}$ | $c_{12}$ | $c_{11}$ | $c_{10}$ | $c_9$ | $c_8$ | $c_7$ | $c_6$ | $c_5$ | $c_4$ | $c_3$ | $c_2$ | $c_1$ | $c_0$ | Alt |
| 5:Y | $c_{13}$ | $c_{12}$ | $c_{11}$ | $c_{10}$ | $c_9$ | x | $c_8$ | $c_7$ | $c_6$ | $c_5$ | $c_4$ | $c_3$ | $c_2$ | $c_1$ | $c_0$ | Alt |
| 5:X | $c_{13}$ | $c_{12}$ | $c_{11}$ | $c_{10}$ | $c_9$ | $c_8$ | $c_7$ | $c_6$ | $c_5$ | $c_4$ | x | $c_3$ | $c_2$ | $c_1$ | $c_0$ | Alt |
| 4:Z | $c_{13}$ | x | $c_{12}$ | $c_{11}$ | $c_{10}$ | $c_9$ | $c_8$ | $c_7$ | $c_6$ | $c_5$ | $c_4$ | $c_3$ | $c_2$ | $c_1$ | $c_0$ | Alt |
| 4:Y | $c_{13}$ | $c_{12}$ | $c_{11}$ | $c_{10}$ | $c_9$ | $c_8$ | x | $c_7$ | $c_6$ | $c_5$ | $c_4$ | $c_3$ | $c_2$ | $c_1$ | $c_0$ | Alt |
| 4:X | $c_{13}$ | $c_{12}$ | $c_{11}$ | $c_{10}$ | $c_9$ | $c_8$ | $c_7$ | $c_6$ | $c_5$ | $c_4$ | $c_3$ | x | $c_2$ | $c_1$ | $c_0$ | Alt |
| 3:Z | $c_{13}$ | $c_{12}$ | x | $c_{11}$ | $c_{10}$ | $c_9$ | $c_8$ | $c_7$ | $c_6$ | $c_5$ | $c_4$ | $c_3$ | $c_2$ | $c_1$ | $c_0$ | Alt |
| 3:Y | $c_{13}$ | $c_{12}$ | $c_{11}$ | $c_{10}$ | $c_9$ | $c_8$ | $c_7$ | x | $c_6$ | $c_5$ | $c_4$ | $c_3$ | $c_2$ | $c_1$ | $c_0$ | Alt |
| 3:X | $c_{13}$ | $c_{12}$ | $c_{11}$ | $c_{10}$ | $c_9$ | $c_8$ | $c_7$ | $c_6$ | $c_5$ | $c_4$ | $c_3$ | $c_2$ | x | $c_1$ | $c_0$ | Seq |
| 2:Z | $c_{13}$ | $c_{12}$ | $c_{11}$ | x | $c_{10}$ | $c_9$ | $c_8$ | $c_7$ | $c_6$ | $c_5$ | $c_4$ | $c_3$ | $c_2$ | $c_1$ | $c_0$ | Alt |
| 2:Y | $c_{13}$ | $c_{12}$ | $c_{11}$ | $c_{10}$ | $c_9$ | $c_8$ | $c_7$ | $c_6$ | x | $c_5$ | $c_4$ | $c_3$ | $c_2$ | $c_1$ | $c_0$ | Alt |
| 2:X | $c_{13}$ | $c_{12}$ | $c_{11}$ | $c_{10}$ | $c_9$ | $c_8$ | $c_7$ | $c_6$ | $c_5$ | $c_4$ | $c_3$ | $c_2$ | $c_1$ | x | $c_0$ | Seq |
| 1:Z | $c_{13}$ | $c_{12}$ | $c_{11}$ | $c_{10}$ | x | $c_9$ | $c_8$ | $c_7$ | $c_6$ | $c_5$ | $c_4$ | $c_3$ | $c_2$ | $c_1$ | $c_0$ | Alt |
| 1:Y | $c_{13}$ | $c_{12}$ | $c_{11}$ | $c_{10}$ | $c_9$ | $c_8$ | $c_7$ | $c_6$ | $c_5$ | x | $c_4$ | $c_3$ | $c_2$ | $c_1$ | $c_0$ | Alt |
| 1:X | $c_{13}$ | $c_{12}$ | $c_{11}$ | $c_{10}$ | $c_9$ | $c_8$ | $c_7$ | $c_6$ | $c_5$ | $c_4$ | $c_3$ | $c_2$ | $c_1$ | $c_0$ | x | Seq |

Figure 10

METHOD AND APPARATUS FOR EVALUATION OF MULTI-DIMENSIONAL DISCRETE FOURIER TRANSFORMS

FIELD

The specification relates generally to signal processing and more particularly relates to an algorithm and architecture for evaluating multidimensional discrete Fourier transforms.

BACKGROUND

Discrete Fourier transforms (DFTs) are used extensively in a range of computing applications that include, but are not limited to, audio processing, image processing, medical imaging and molecular dynamics simulations of molecular systems. The dimensionality of the transform typically reflects the dimensionality of the underlying computing problem with DFTs of audio samples performed in one dimension (e.g. time), DFTs of planar image processing algorithms performed in two dimensions and DFTs of three-dimensional input data such as volumes performed in three dimensions.

The Cooley-Tukey Fast Fourier Transform (FFT) algorithm is an FFT algorithm for evaluating one-dimensional DFTs using a computer. It divides an input data sequence of length N into two smaller sequences, transforms them independently and recombines the results. The algorithm reduces asymptotic complexity from $O(N^2)$ for explicit evaluation of the DFT to $O(N \cdot \log(N))$ for specific values of N, such as N being a power of two. A common property of FFT algorithms performed in-place is the production of data in bit-reversed order where the least-significant bit of the input index expressed as a binary number becomes the most-significant bit of the output index, for example as described in Handbook of Real-Time Fast Fourier Transforms, by W. W. Smith and J. M. Smith (New York, USA: IEEE Press, 1995).

DFTs of multiple dimensions are often evaluated by performing DFTs of smaller dimensionality along independent dimensional axes, a process referred to herein as "decomposition." Due to their often large size and stringent computing-time requirements the computation of multidimensional DFTs are frequently distributed across a plurality of processors.

The "pencil" decomposition technique evaluates multidimensional DFTs using a series of one-dimensional transforms applied along "pencils" of data in-place along each dimension successively (for example as described in "A Volumetric FFT for BlueGene/L" by M. Eleftheriou, J. E. Moreira, B. G. Fitch, and R. S. Germain, in HiPC, 2003, pp. 194-203). The term "pencil" refers to a one-dimensional N-element array of contiguous elements taken along a specific dimensional axis of the multidimensional transform data, where N is the length of the transform data in the dimension under consideration. This technique typically utilizes packaged one-dimensional FFT routines and requires that the output of each transform is produced in natural order.

The transformation of pencils along a given dimensional axis can occur independently of each other and can be distributed across multiple processors and evaluated in parallel to reduce execution time.

A critical operation that limits the scalability of this approach is the transpose of multidimensional data that must be performed between the evaluations of one-dimensional FFTs along each dimension. The transpose requires either communication of multidimensional data between one or more central nodes and a plurality of FFT processors during each transpose step or communication of multidimensional data directly between FFT processing nodes in an all-to-all fashion. Both cases require the transpose operation to re-order the multidimensional data such that each FFT processing node has local access to all of the data required for a given pencil prior to initiating the transformation for that pencil. The one-dimensional FFT algorithm may also impose additional requirements on the spatial locality and ordering of input data in memory to achieve peak processing throughput. To satisfy these requirements, the transpose operation must perform multiple non-contiguous memory accesses to reorganize multidimensional data into localized, contiguous one-dimensional pencils. Memory accesses of this nature can overwhelm the caching structures of modern processors, especially for multidimensional transforms of large dimensions. Processors tasked with evaluating FFTs are stalled waiting to receive new data while the transpose operations are in progress.

Other decomposition strategies have been formulated to reduce the communication and memory access overhead of transpose operations. The slab decomposition technique for three-dimensional DFTs eliminates one of the two transpose operations required by the pencil decomposition technique by treating data from two of the three dimensions of the transformation input data elements as a series of rectangular planes, and distributing the computation of the planes (or "slabs") across multiple processors. These slabs are transformed locally by the processors to which they are assigned by using two-dimensional FFT libraries, by using one-dimensional FFT libraries capable of in-place transformations using strided memory accesses or by using one-dimensional FFT libraries and performing the two-dimensional transpose operation locally. This approach assumes the data for each plane, or "slab" is sufficiently localized and small enough to fit into a cache so that the transform of the slab along two dimensions can be computed efficiently by a processor. The drawback of this approach is that the scalability of this solution is bounded by the maximum number of elements along one of the three dimensions.

The volumetric decomposition strategy improves upon the pencil decomposition strategy by subdividing a three-dimensional input dataset over a three-dimensional mesh of processors interconnected using a toroidal network topology (for example as described in "A Volumetric FFT for BlueGene/L" by M. Eleftheriou, J. E. Moreira, B. G. Fitch, and R. S. Germain, in HiPC, 2003, pp. 194-203). Each processor is initially assigned a contiguous sub-cube of the input data. The computation begins with a transpose operation along one of the three axes that redistributes the data such that each processor contains an equal number of pencils to transform locally. This approach is superior to pencil decomposition because the transpose operation can occur efficiently across the links of the toroidal network connections. Data locality is also improved over the original pencil decomposition strategy as smaller amounts of data are being handled by each processor. Every processor is responsible for arranging data received from other processors into its local memory and performing the one-dimensional FFTs. Once this process has completed, another transpose is performed to restore the transformed data to its initial distribution. The same sequence is carried out along the other two axes. This strategy reduces the cost of the transpose operations of the pencil decomposition technique while retaining its scalability. However, twice as many transpose operations must be performed with volumetric decomposition and a specific network topology is required.

SUMMARY

A first aspect of the specification provides a device and method for evaluating multidimensional DFTs in a manner that eliminates the transpose operation required by the prior art, by transforming every dimension concurrently.

A second aspect of the specification provides a device and method for recursive subdivision of multidimensional input data dimensionality D and dimensions $N_1 \times N_2 \times \ldots \times N_D$ across every dimension simultaneously according to one or more radix vectors $r=<r_1, r_2, \ldots r_D>$, arrangement and distribution of subdivided data across a plurality of processors, communication of local data between processors to perform butterfly operations and complex rotations, and independent evaluation of smaller, independent multidimensional DFTs by each processor. Also provided are generation of burst read and write access requests to memory storage local to each processor and generation of indices to a constant table to produce complex rotation factors in sequence.

A third aspect of the specification provides a Vector-Radix FFT (VR-FFT) device for calculating the three-dimensional discrete Fourier Transform for input data of dimensions 128×128×128 is disclosed. The device comprises: a host processor, an interconnection network, and eight identical VR-FFT computing nodes which are each comprised of a local memory, a full-duplex network interface and Field-Programmable Gate Array (FPGA) device such as the Xilinx Virtex-II Pro XC2VP100, which is used to implement a memory interface controller, a network interface controller and a VR-FFT module. The VR-FFT module consists of a pipelined datapath that is comprised of a memory access unit, a complex rotation factor generation unit and an arithmetic unit, as well as a control unit for coordinating the activities of each module. The memory access unit generates read accesses from locations in the local memory and write accesses to locations in the local memory using counters that are updated according to the radix vector, dimensions and dimensionality of the VR-FFT, the burst length of the local memory controller and at least one additional counter to denote the loop stage of the VR-FFT. The complex rotation factor generation unit produces complex rotation factors according to the number and index of the VR-FFT node, the radix vector, dimensions and dimensionality of the VR-FFT, at least one counter denoting the index of the current element at the head of the pipeline and at least one counter denoting the loop stage of the VR-FFT. The pipelined arithmetic unit is comprised of an addition unit and subtraction unit for performing butterfly operations concurrently, a complex multiplication unit for performing complex rotations, and control inputs to dynamically select the required arithmetic operation.

These and other objectives of the present invention will become obvious to those with ordinary skill in the art after reading the following detailed description of the embodiment that is illustrated in the various figures and drawings.

BRIEF DESCRIPTIONS OF THE DRAWINGS

Embodiments are described with reference to the following figures, in which:

FIG. 2 is a pseudocode representation of the address generation method for accessing data elements from memory for using the vector radix approach for calculating discrete multidimensional Fourier transforms according to the present invention.

FIG. 3 is a pseudocode representation of the complex rotation factor generation method for generation of complex rotation factors for use with the vector radix approach for calculating discrete multidimensional Fourier transforms according to the present invention.

FIG. 9 illustrates two operating modes for accessing a storage memory.

FIG. 10 is a table of bitwise permutations that implement a custom addressing counter.

Figure 13:
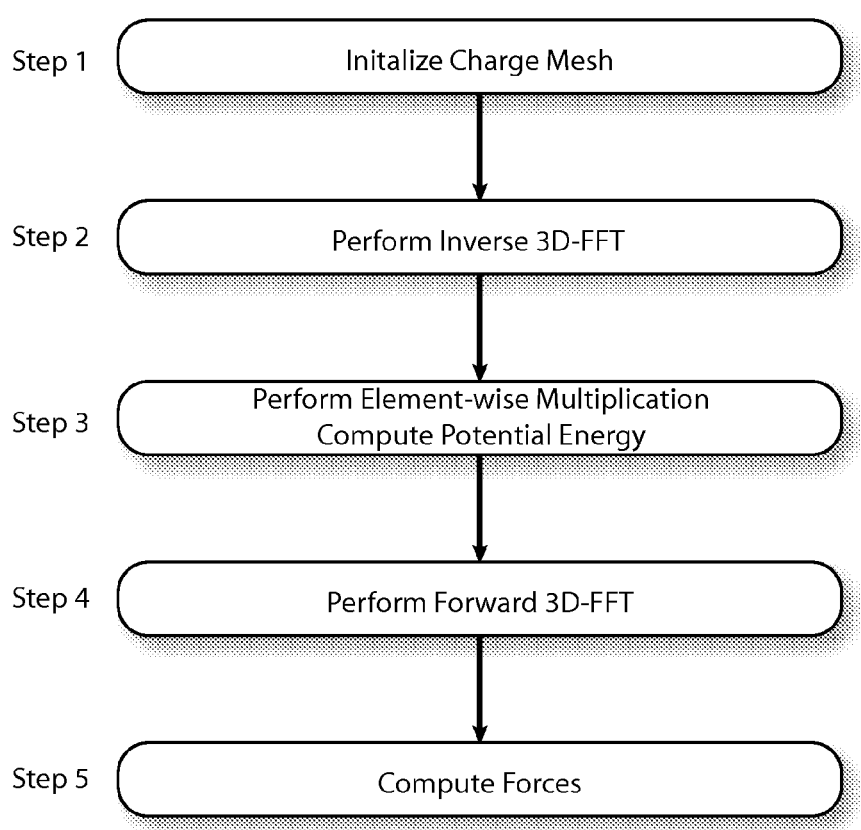

FIG. 13 demonstrates the steps performed by the Smooth Particle Mesh Ewald algorithm.

DETAILED DESCRIPTION OF THE EMBODIMENTS

Figure 1:
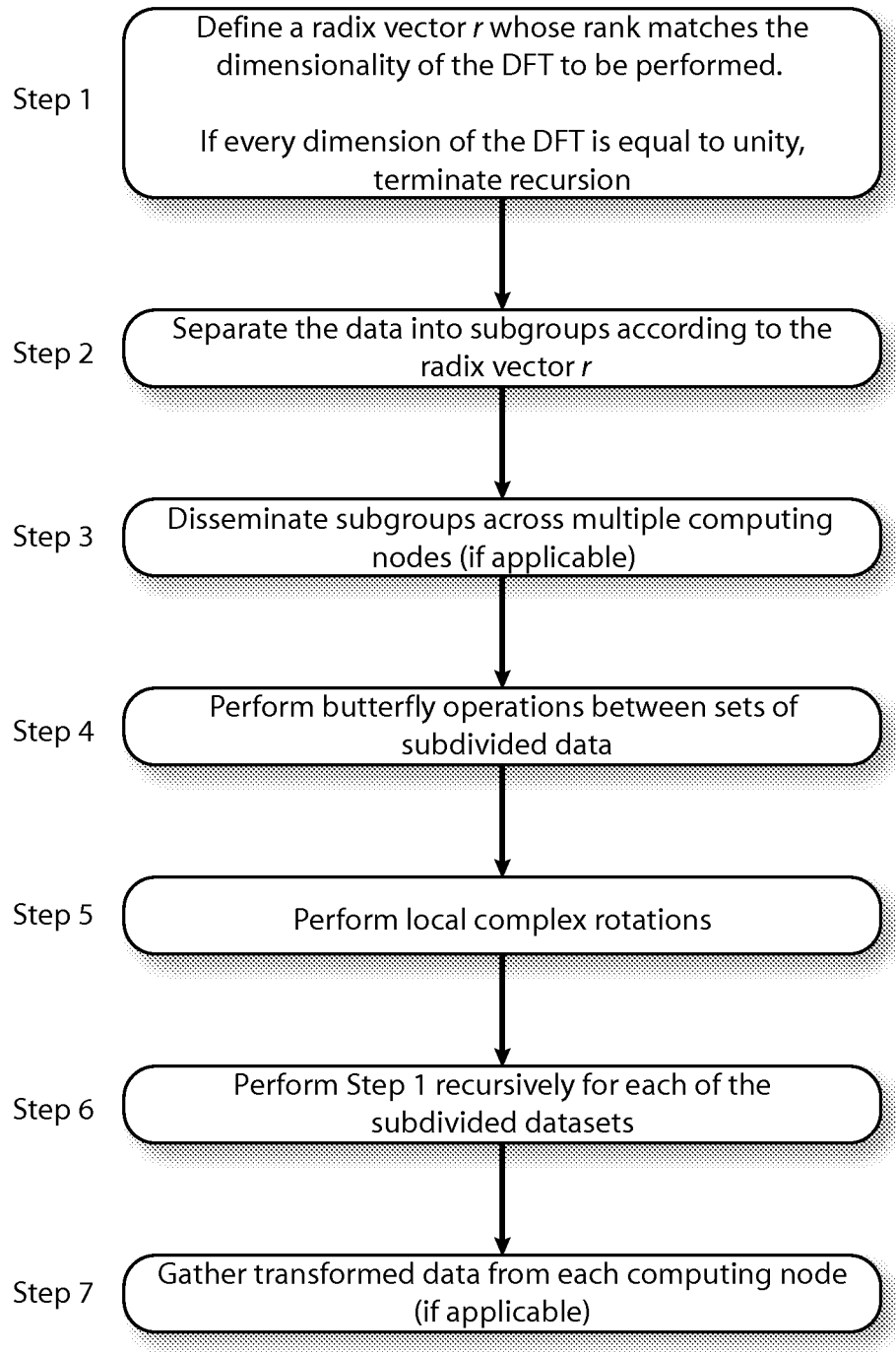
FIG. 1 is a flowchart of the calculation of the discrete multidimensional Fourier transform using the vector radix approach according to the present invention.

FIG. 1 denotes the flowchart of the method for computing the discrete Fourier Transform of a dataset with arbitrary dimensions and dimensionality by means of a recursive divide and conquer strategy. This method may be implemented as a program, circuit or machine that produces transformed outputs.

In Step 1 of FIG. 1, the possible values for the radix vector r are determined by the dimensions of the input data using criteria similar to how the scalar radix of a one-dimensional FFT is selected, for example as described in Handbook of Real-Time Fast Fourier Transforms, by W. W. Smith and J. M. Smith (New York, USA: IEEE Press, 1995). Non-limiting examples include using a radix vector of $r=<2, 2, \ldots, 2>$ for input data with dimensions that are all powers of two, or a radix vector of $r=<4, 4, \ldots, 4>$ for dimensions that are all powers of four.

In Step 2 of FIG. 1, input data is subdivided into smaller groups as specified by the radix vector. Carrying on with the example above, a radix vector with every radix element equal to two will subdivide a D-dimensional $N \times N \times \ldots \times N$-point dataset into $2^D$ smaller datasets, each $N/2 \times N/2 \times \ldots \times N/2$ points in size. The subdivision is performed by taking contiguous ranges of elements in each dimension, thus a radix of $r=2$ subdivides a one-dimensional input sequence into upper and lower halves, $r=<2,2>$ subdivides a two-dimensional matrix into four equal quadrants, a radix of $r=<2,2,2>$ subdivides a three-dimensional volume into eight equal octants and so forth.

Step 3 of FIG. 1 disseminates subdivided input data across a plurality of computing nodes for distributed computation. This step is omitted if all datasets are to be computed by the same processor. Step 4 of FIG. 1 performs arithmetic operations that require operands from more than one set of subdivided data. In cases where subdivided data resides on different computing nodes, the communication interfaces are used to exchange data between pairs or groups of computing nodes and each computing node performs the necessary arithmetic independently. The operations performed in this step are referred to as inter-node butterfly operations.

Step 5 of FIG. 1 rotates the complex phase of every element in every subgroup by a complex coefficient defined by the radix vector, the dimensions of the original dataset in Step 1 of FIG. 1 and the original coordinates of the element. The VR-FFT is called recursively on each of the subdivided datasets in Step 6. Since these operations are independent of one another, they may be evaluated in a parallel fashion. Step 7 gathers the output of the transformed datasets into a single dataset.

Readers with knowledge in the art will recognize the flowchart in FIG. 1 follows a decimation-in-frequency (DIF) strategy for performing FFTs, therefore it is expected that input data is available in memory in natural order and output data will be provided in bit-reversed order. The decimation-in-time (DIT) strategy expects input data in bit-reversed order, reverses the order of steps 4-6 of FIG. 1 and produces output data in natural order.

The VR-FFT algorithm described in Steps 1-7 of FIG. 1 does not require that all radix elements within a given radix vector r be equal to each other, nor does it require that the radix vector r remain constant for different depths of recursion or across different subsets of input data. As a result, the VR-FFT algorithm is able to utilize split-radix techniques and select the appropriate radix size for the current subgroup to reduce the number of arithmetic operations wherever possible. A combination of differing FFT radix factorization techniques can be used in this manner, including but not limited to radix-2, radix-4, prime-factor and Winograd techniques. The VR-FFT algorithm is also capable of performing transformations on data where the number of data elements in every dimension is not equal. This is achieved by setting the radix vector element to unity if the corresponding dimension of the subgroup is equal to unity, indicating that the Fourier transformations in that dimension have been completely applied. The recursive VR-FFT relationship terminates once all elements of the radix vector are equal to unity, which corresponds to an input dataset with all dimensions equal to unity.

It is possible to modify step 6 of FIG. 1 such that the VR-FFT method may be evaluated without the use of recursion. Rather, the VR-FFT calculation of FIG. 1 may be performed by executing steps 2, 4 and 5 of FIG. 1 in a breadth-first fashion (that is, all computations for a given recursion depth are executed prior to proceeding to the next level of recursion depth rather than the proposed depth-first fashion. Such a strategy permits the evaluation of the VR-FFT by means of a series of four nested loops, which may then be unrolled to reduce computation time.

The code listing #200 in FIG. 2 illustrates an example of evaluating a radix-<2, 2, . . . 2> DIF multidimensional transform of equal dimensions using a breadth-first recursion strategy. The listing assumes that the multidimensional input data is stored at the memory address specified by pointer p_mem_array in linear fashion specified by the C-language specification for storage of multidimensional arrays in memory (for example as described in ISO/IEC 9899:1999, Programming Languages—C). The loop variable depth tracks the recursion depth starting from the largest datasets measuring $2^{order}$ elements in each dimension and proceeding to the terminal recursion case of $2^0=1$ element in each dimension. The loop variable dim enumerates the total number of dimensions of the input dataset. The inner_bound variable specifies the number of contiguous elements stored in memory that are to be "butterflied" with the next set of contiguous elements in memory of the same size. For instance, during the first iterations of the depth and dim loop counters, the value of inner_bound will equal half of the total number of input elements (NUM_ELEMENTS/2) and variable outer_increment will equal the total number of input elements (NUM_ELEMENTS). These loop counter values perform an in-place butterfly operation of the "upper" half of the data elements along the most significant dimensional axis with the "lower" half Subsequent iterations of dim will continue to perform in-place butterflies between upper and lower halves of data along the remaining dimensional axes.

Loop counter outer_loop tracks the number of sets of butterfly computations performed between contiguous groups of data, and loop counter inner_loop enumerates the specific butterfly operation performed within the group of butterflies specified by outer_loop. Index counters idx_a and idx_b form the indices of the butterfly operands stored in array p_mem_array. Complex rotations are applied as necessary once for every level of recursion depth at the terminus of the dim counter. Note that the complex rotation corresponding to depth=0 is omitted as all complex factors are equal to unity.

The code listing #201 in FIG. 3 shows how complex rotation coefficients are generated for Step 5 of FIG. 1 for an example of evaluating a radix <2,2,2> DIF transform of three-dimensional input data containing an equal number of points ($2^{LOG\_MAX\_DIMENSIONS}$) in each dimension. A table of complex rotation coefficients of base LOG_MAX_DIMENSIONS is precomputed and stored in the complex array cf_table. The value of the variable depth is set according to the recursion depth and takes on values from LOG_MAX_DIMENSIONS-1 to 0. The x, y, and z loop variables enumerate the rotation coefficient that is being generated for the corresponding element at coordinates (x,y,z).

The variable depth_mask generates a masking bit that is used to determine elements that require non-unity rotation coefficients. Coordinates x, y or z with this bit set imply that the element at that coordinate for the given dimension falls into the lower branch of a butterfly operation and therefore requires a non-unity complex rotation coefficient that is determined by using the depth-1 least-significant bits of the index (y_cf_idx and z_cf_idx). A single complex coefficient is generated by combining the three complex coefficients from each dimension by summing their respective rotation coefficient indices to form the variable cf_idx. The modulus of cf_idx is taken by extracting the depth least-significant bits of cf_idx to prevent overflowing the range of the array at cf_table. The final left-shift operation effectively changes the base of the complex rotation coefficients returned by the table cf_table from LOG_MAX_DEPTH to depth by multiplying the value of cf_idx by a power of two, which corresponds to dividing the base of the returned coefficient by the same power of two. This operation permits the same table to be reused irrespective of the value of depth.

Figure 4:
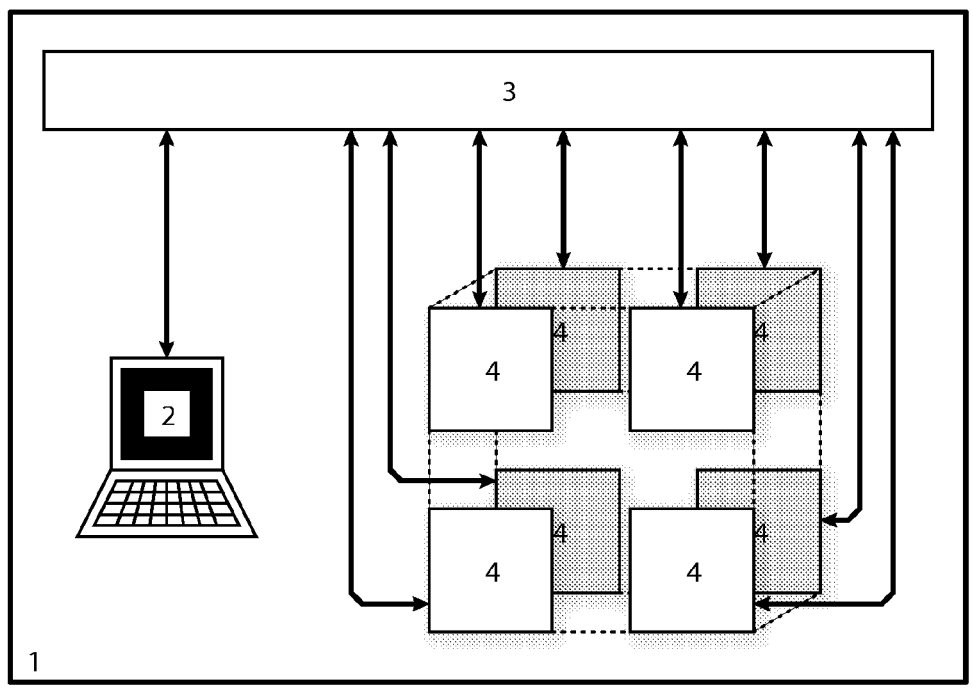
FIG. 4 is a diagram of a device for implementing the calculation of the vector-radix discrete multidimensional Fourier transform.

FIG. 4 depicts a VR-FFT device #1 used for calculating multidimensional discrete Fourier transforms. The VR-FFT device #1 is a processing device for evaluating multidimensional discrete Fourier transforms of dimension 128×128×128. The VR-FFT device #1 comprises a host processor #2, an interconnection network #3 and eight VR-FFT computing nodes #4 arranged in a three-dimensional mesh topology. The host processor #2 facilitates the dissemination of input data to the computing nodes #4 and collection of output data from the computing nodes #4.

Figure 5:
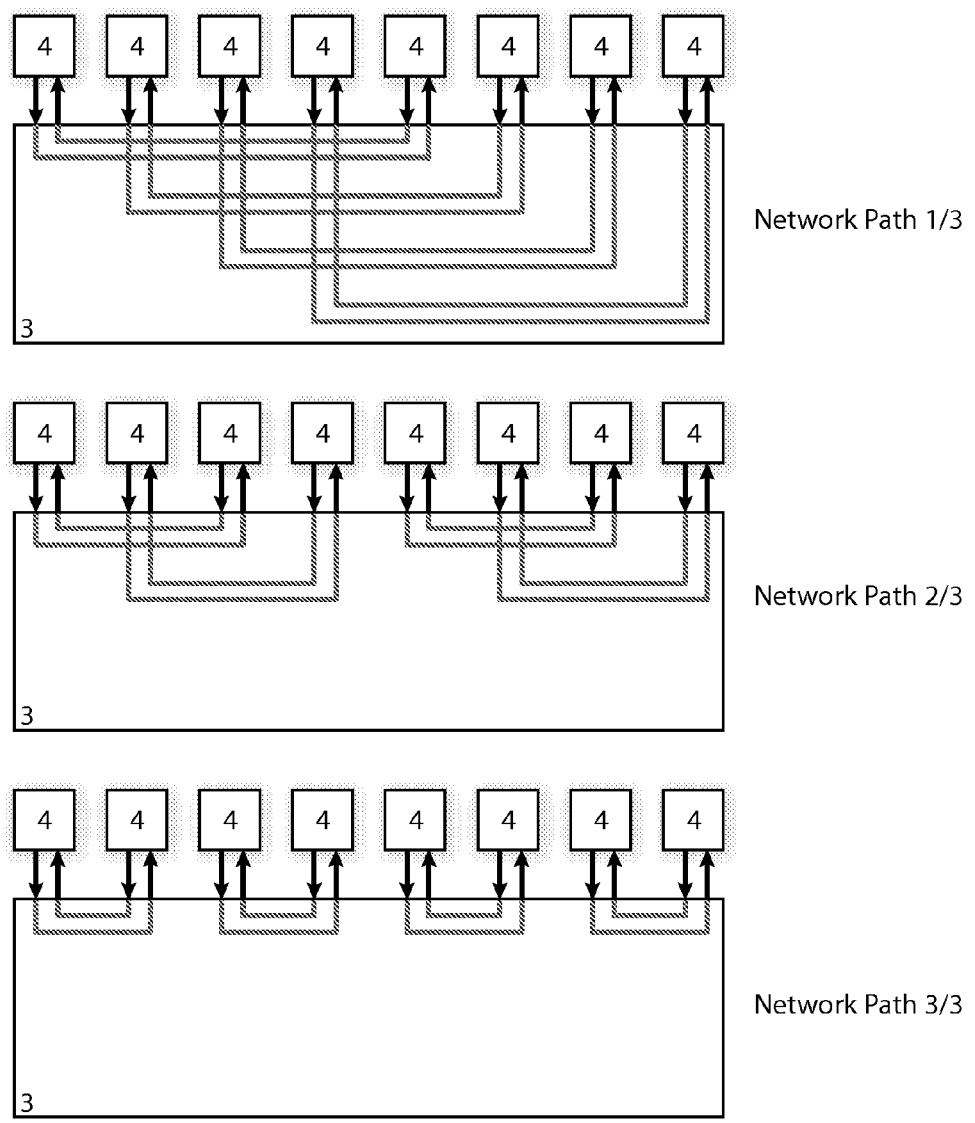
FIG. 5 illustrates the required routing capabilities of a communication network.

FIG. 5 illustrates the three non-blocking full-duplex network paths that must be supported by the interconnection network #3 to support butterfly operations between the computing nodes #4. Each of the three paths require the network #3 to sustain its full bisection bandwidth among the eight VR-FFT computing nodes #4.

Figure 6:
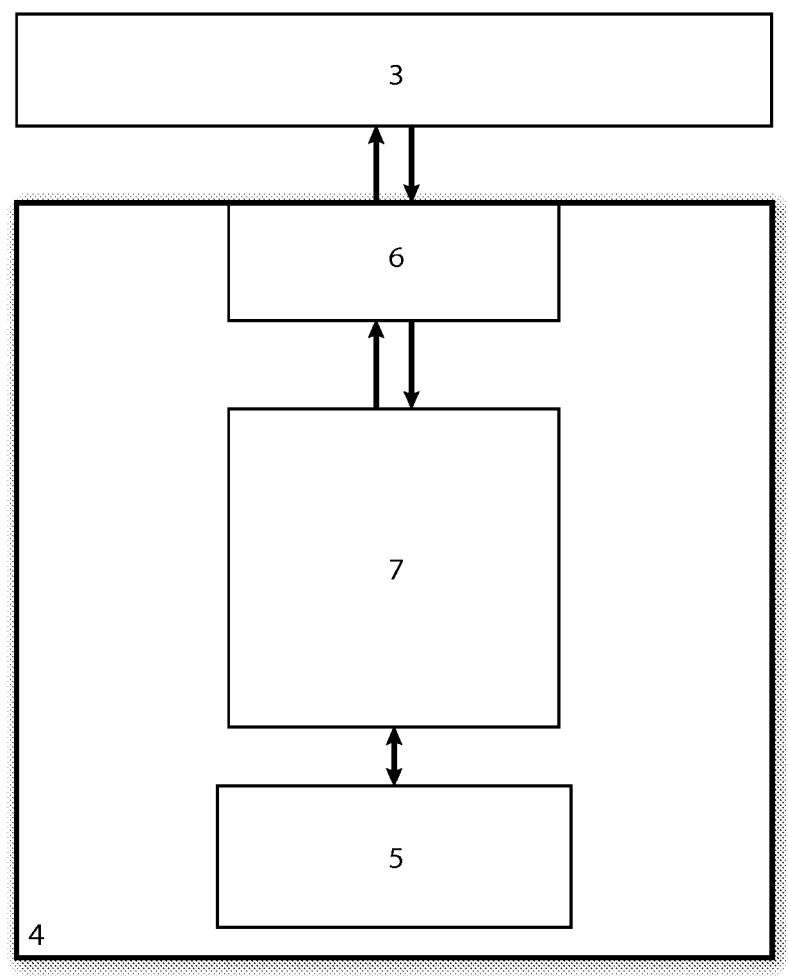
FIG. 6 illustrates an architecture for a pipelined VR-FFT computing node.

FIG. 6 illustrates an architecture for a pipelined VR-FFT computing node #4. The node #4 comprises a local memory #5, a full-duplex network interface #6 for attaching the computing node #4 to the interconnection network #3 and a processing unit #7, which may be realized using a device such as a processor, a multi-core processor, a digital-signal processor (DSP), a field programmable gate array (FPGA) or other computing device.

Figure 7:
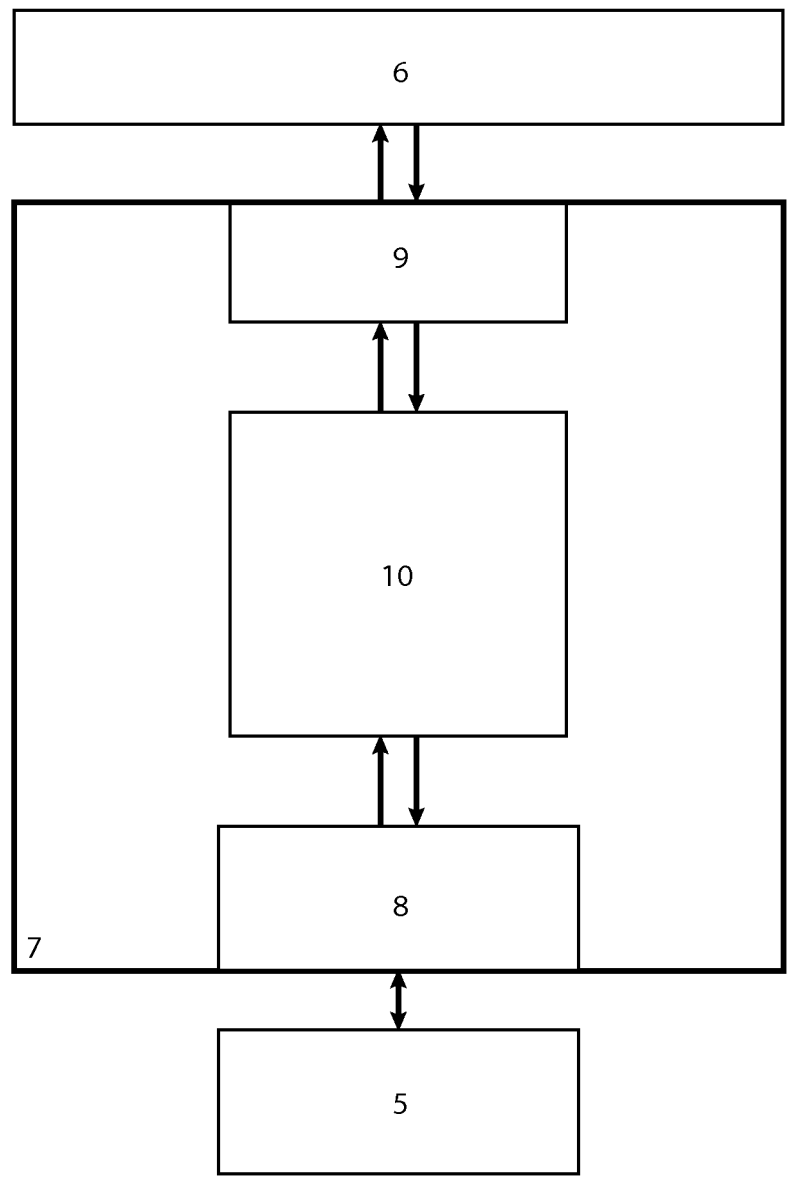
FIG. 7 shows the architecture of the processing unit of a pipelined VR-FFT computing node.

FIG. 7 shows the architecture of the processing unit #7, which consists of a memory interface controller #8, a network interface controller #9 and a VR-FFT processing engine #10.

Figure 8:
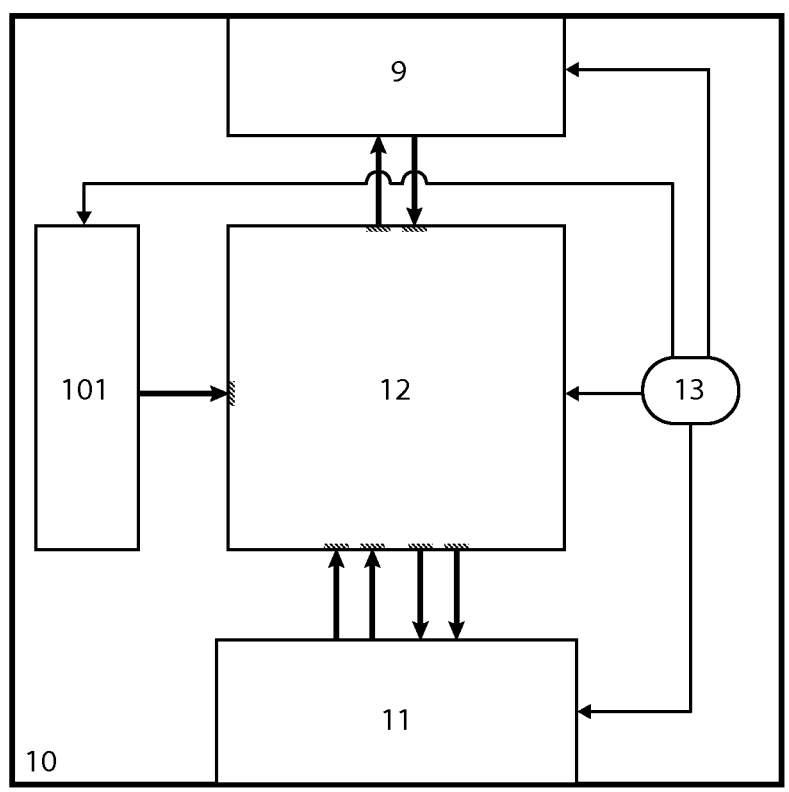
FIG. 8 shows the architecture of a streaming processing engine for the processing unit of a pipelined VR-FFT computing node.

The architecture of the VR-FFT processing engine #10 is shown in FIG. 8. The engine #10 is a pipelined datapath that comprises a memory access unit #11, a complex rotation factor generation unit #101, an arithmetic unit #12 and a control unit #13. The control unit #13 tracks the recursion depth of the VR-FFT algorithm in FIG. 1, selects the operation mode of the arithmetic unit #12, instructs the memory access unit #11 of whether to operate in DIT or DIF mode, sends the necessary parameters (forward/inverse transforms, DIT/DIF mode and recursion depth) to the complex rotation factor generation unit #101 for generation of appropriate coefficients and specifies network communication partners to network interface controller #9.

The memory access unit #11 generates read and write requests to the memory interface controller #8 based on the DIT or DIF operating mode input from control unit #13, the recursion depth counter input from control unit #13, as well as the minimum burst length B supported by local memory #5 and memory interface controller #8. The B parameter determines the minimum number of data beats that must be read from or written to the local memory #5 in a single access to maximize data throughput. Read and write addresses are generated independently using identical circuits that operate out of sync to compensate for the pipeline processing delay of engine #10.

The access unit #11 operates in one of two addressing modes during butterfly computation operations, during which two operands must be fetched from memory and presented to arithmetic unit #12. In cases where the absolute difference in memory indices between butterfly operations ($\Delta A = idx\_b - idx\_a$ in FIG. 2) exceeds the number of memory elements contained in a burst of size B, unit #11 alternates between issuing burst operations from locations idx_a and idx_b and buffers the data to align operands. In cases where the difference in memory indices is equal to or less than the number of elements contained within a single burst, unit #11 issues burst read and write accesses from sequential locations in memory and aligns data within bursts. FIG. 9 illustrates the two operating modes of unit #11, which may also be referred to as a re-ordering buffer. Addresses are generated sequentially by memory access unit #11 during data dissemination and gathering operations, complex rotation operations and inter-node butterfly operations.

The table in FIG. 10 describes a sample of the read access addresses generated by unit #11 that are required for a mesh of size $32 \times 32 \times 32 = 2^{15}$ elements, a DIF processing strategy, a radix vector of r=<2,2,2> and a burst length B of eight elements. The "stage" column denotes the recursion depth of the VR-FFT algorithm (where a value of one corresponds to a $1 \times 1 \times 1$-point transform), as well as the current dimensional axis of the butterfly operation. Binary digits $c_{13} \ldots c_0$ represent a 14-bit binary up-counter that tracks the current butterfly operation in progress. Binary digit x corresponds to the inner_bound variable in FIG. 2 and toggles to indicate if the current element is directed to the upper or lower butterfly branch of the arithmetic unit #12. Columns $a_{14} \ldots a_0$ denote the 15-bit binary result formed by permuting the binary digits of counter $c_{14} \ldots c_0$ as well as binary digit x. This value is the read address presented to the memory interface controller #8. The three least-significant bits of the address ($a_2 a_1 a_0$) are ignored due to the burst length.

Figure 11:
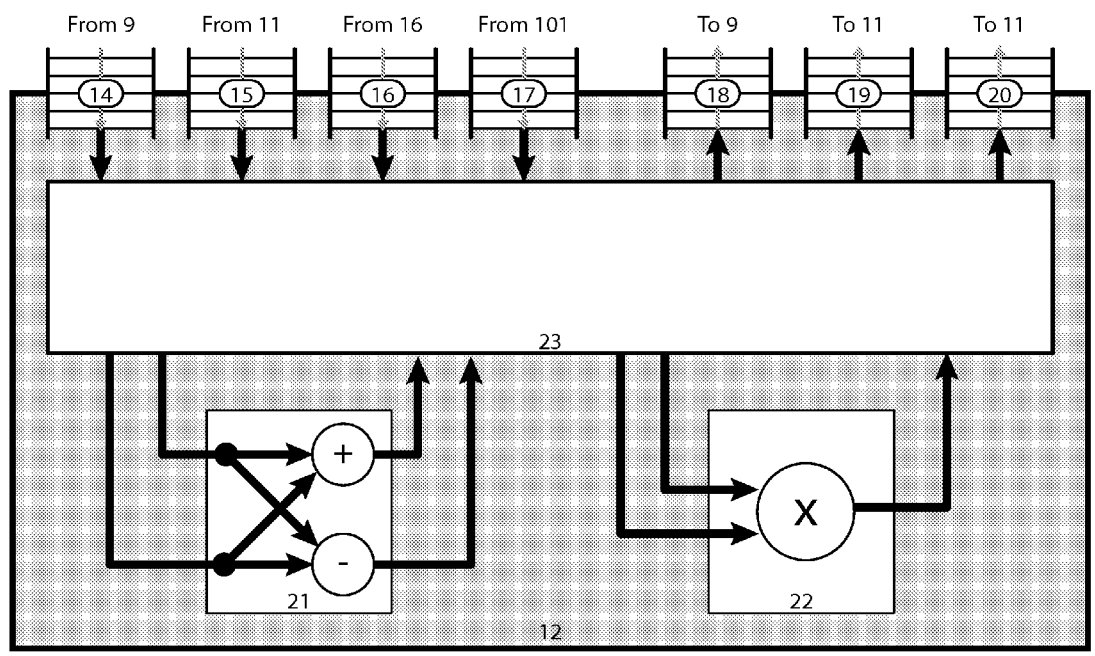
FIG. 11 illustrates the external interfaces and internal architecture of an arithmetic unit.

The arithmetic unit #12 is illustrated in FIG. 11 and comprises four ingress ports (#14, #15, #16, #17) for consuming streams of element data, three egress ports (#18, #19, #20) for producing streams of element data, a butterfly addition/subtraction unit #21, a complex multiplication unit #22 and a network for routing streaming data #23. The arithmetic unit #12 performs one of five operations selected during run-time by control unit #13. The first mode is active during the data dissemination phase (Step 3 of FIG. 1) wherein data received from the ingress port #14 produced by network interface controller #9 is directed to the egress port #19 connected to the memory access unit #11 and written directly to local memory #5.

The second mode is used during inter-node butterfly operations where the contents of local memory #5 are transmitted to another VR-FFT computing node #4 while simultaneously receiving the contents of its local memory #5. The received data is either added to or subtracted from the contents of local memory #5, rotated in the complex plane (during the last inter-node butterfly stage of the recursion depth) and written back to local memory #5. The arithmetic unit #12 achieves this by reading the contents of local memory #5 from ingress port #15 via memory access unit #11, and directing the stream to the butterfly addition/subtraction unit #21 as well as to egress port #18, which is connected to the network interface controller #9. Data produced from either the sum or difference output of the butterfly addition/subtraction unit #21 is directed to the complex multiplication unit #22, where it is optionally multiplied by complex rotation factors received from complex factor generation unit #101 via ingress port #17. The results produced by the complex multiplication unit #22 are directed to egress port #19 and written back to the local memory #5 via the memory access unit #11.

The third mode of the arithmetic unit #12 performs butterfly operations. Element data is read from the local memory #5 by memory access unit #11 and streamed to ingress ports #15 and #16. These streams are directed to the butterfly addition/subtraction unit to compute both the sum and the difference of the two streams. The sum stream is directed to egress port #19 and the difference stream to egress port #20, where they are written back to the local memory #5 via the memory access unit #11.

The fourth mode of the arithmetic unit #12 applies complex rotations to data stored in local memory #5. Element data is read from the local memory #5 by memory access unit #11 and streamed to ingress port #15. Complex coefficients are generated by complex factor generation unit #101 and streamed to ingress port #17. The arithmetic unit #12 directs both ingress streams to complex multiplication unit #22, and directs the output stream of the multiplication unit #22 to egress port #19 where it is written to local memory #5 by memory access unit #11.

The fifth operating mode of the arithmetic unit #12 is used to implement the gathering of transformed data by the host processor #2 according to Step 7 of FIG. 1. Element data is read from the local memory #5 by memory access unit #11 and streamed to ingress ports #15, where it is redirected via egress port #18 to the network interface controller #9.

Figure 12:
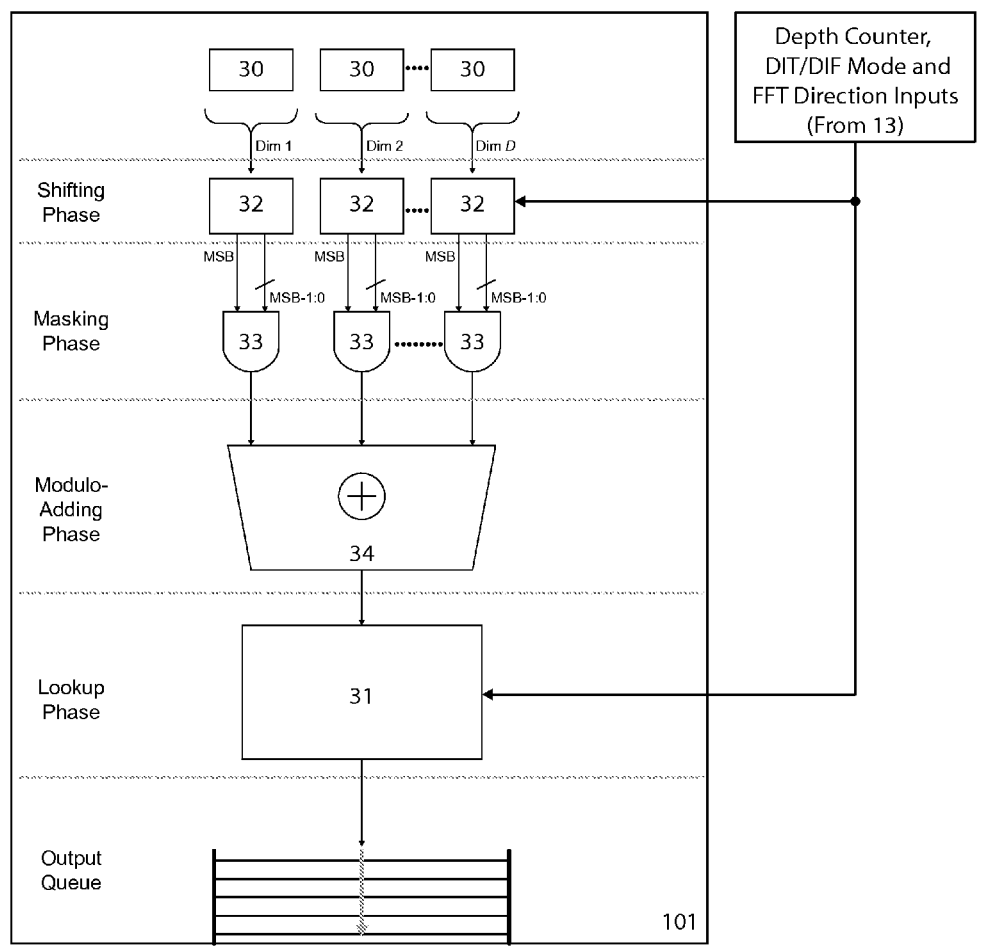
FIG. 12 illustrates the architecture of a unit for the generation of a stream of complex rotation coefficients.

The complex factor generation unit #101 shown in FIG. 12 generates a stream of complex rotation coefficients (also referred to as twiddle factors) based on the DIT or DIF operating mode input from control unit #13, the recursion depth counter input from control unit #13, the transform direction (forward or inverse) input from unit #13, the dimensions of the input data mesh and a set of counters #30 used to track the coordinates of the current element in every dimension. A table #31 of N pre-computed values is used to store complex rotation coefficients, where N is the number of elements along the largest dimension of the original input data mesh. A set of shifters #32 and masking units #33 per each dimension feed a multi-input adder/modulus unit #34 and generate the appropriate index to the constant table #31, which in turn produces the required complex coefficient as described in FIG. 3. Selection of forward or inverse FFT modes is achieved by inverting the sign of the imaginary coefficient produced by #31.

A non-limiting example that demonstrates a use case of present embodiments is now described. The Smooth Particle Mesh Ewald (SPME) algorithm is used to evaluate electrostatic interactions between atoms in Molecular Dynamics (MD) simulations (for example, as described in "A smooth particle mesh ewald method" by M. B. U. Essmann, L. Perera, J. Chem. Phys, vol. 103, no. 19, pp. 8577-8593, 1995). At the core of the algorithm is a discrete, three dimensional convolution operation that convolves a three-dimensional input data-set (typically containing ~$10^2$ elements per dimension) with a Gaussian charge-spreading function that is represented by a data-set of constant, real-valued coefficients of the same dimensions. The SPME algorithm is performed in MD simulations every few simulation time-steps over the course of potentially millions of time-steps. It has been shown that the evaluation of the SPME algorithm can be a dominant factor in performing MD simulations, furthermore, it has also been shown that the evaluation of the discrete three-dimensional convolution occupies the largest fraction of computing time during the execution of the SPME algorithm. The most common strategy employed to reduce the execution time of the convolution evaluation is to utilize the convolution theorem and change the three-dimensional convolution problem into an element-wise multiplication of two three-dimensional datasets in Fourier space. This operation requires the evaluation of a forward and inverse three-dimensional Fourier transform, which is typically performed in a parallel fashion using techniques described in the background section (for example, as described in "NAMD: biomolecular simulation on thousands of processors" by J. C. Phillips, G. Zheng, S. Kumar, and L. V. Kale, in Proceedings of Supercomputing '02, Los Alamitos, Calif., USA: IEEE Computer Society Press, 2002, pp. 1-18.).

FIG. 13 demonstrates the steps performed by the SPME algorithm. Step 1 of FIG. 13 initializes a three-dimensional data-set (the "charge-mesh") by linear superposition of the charge of every atom in the simulation onto a fixed group of elements on the charge mesh. The mapping between an atomic coordinate and its corresponding set of charge mesh coordinates is defined by a mathematical scaling relation. Step 2 of FIG. 13 converts the charge mesh to Fourier space by performing an inverse three-dimensional FFT. Step 3 of FIG. 13 performs an element-wise multiplication between the complex-valued Fourier-space charge mesh data and the Fourier-space Gaussian charge spreading dataset. The Gaussian charge-spreading dataset is computed at the start of a MD simulation and remains constant throughout the simulation. It is stored in Fourier-space for efficiency. The total electrostatic potential energy is also evaluated at this phase in an element-wise fashion using Parseval's Theorem, for example as described in Handbook of Real-Time Fast Fourier Transforms, by W. W. Smith and J. M. Smith (New York, USA: IEEE Press, 1995). Step 4 of FIG. 13 performs a forward three-dimensional FFT of the mesh to return the problem back to real-space. Finally, step 5 of FIG. 13 interpolates inter-atomic electrostatic forces for every atom by using a linear combination of the values at the mesh coordinates defined by the same mapping in step 1 of FIG. 13. Further information regarding the SPME algorithm may be found in "A smooth particle mesh ewald method" by M. B. U. Essmann, L. Perera, J. Chem. Phys, vol. 103, no. 19, pp. 8577-8593, 1995.

The VR-FFT embodiment #1 can accelerate the SPME computation by performing both the inverse and forward Fourier transforms in a distributed fashion. Steps 1 and 5 of FIG. 13 are best performed on naturally-ordered data, therefore the DIF strategy is used for the inverse Fourier transform and the DIT strategy is used to perform the forward Fourier transform. The element-wise multiplication in Step 3 of FIG. 13 must take into account that the Fourier-space charge mesh is in bit-reversed order, however, the overhead of translating the element indices can be avoided by also storing the transformed Gaussian charge-spreading dataset in bit-reversed order. This allows the element-wise multiplication to be performed efficiently using vector and/or streaming operations. The potential energy components for the dataset contained within each computing node #4 can be computed independently and summed by the host processor #2.

Further savings in computation time can be achieved by distributing Step 1 of FIG. 13 to each of the VR-FFT computing nodes #4. This is accomplished by sending atoms within the simulation volume directly to one or more computing nodes #4 whose local memories must be modified. This optimization is possible since (A) a mapping between the coordinates of an atom within the MD simulation volume and the coordinates of affected charge mesh coordinates exists such that atoms within a particular range of atomic coordinates may be sent to one or more VR-FFT computing nodes #4 for initialization, and (B) the initialization of the charge mesh is a linear operation. The same properties can be exploited to distribute Step 5 of FIG. 13 of the algorithm across the VR-FFT computing nodes #4 as well. This method can reduce the computation time required by Step 1 of FIG. 13 as well as Step 5 of FIG. 13 by a factor approximately equal to the number of computing nodes #4 participating.

Alternatively, it is also possible to completely eliminate communication between computing nodes #4 during the VR-FFT operations in the SPME algorithm. The original algorithm typically constructs the mesh in Step 1 of FIG. 13 in one contiguous memory prior to performing the discrete Fourier transform in Step 2 of FIG. 13. Since Step 1 of FIG. 13 is a linear operation, it may be combined with Step 4 of FIG. 1 and Step 5 of FIG. 1 to eliminate communication between compute nodes #4. The coordinates and charges of every atom in the simulation are transmitted to every compute node #4 in the VR-FFT device #1. Each time a mesh element is produced by Step 1 of FIG. 13, a complex rotation is performed on the element based on the coordinate of the element in the original mesh. An addition or subtraction operation is then performed between the rotated element and the element in the corresponding position in the local mesh of the compute node #4. This procedure results in a mesh upon which the initial VR-FFT may be applied.

The communication between computing nodes #4 during Step 4 of FIG. 13 may also be eliminated in a similar manner as above by applying complex rotations to every element accessed from the local mesh during Step 5 of FIG. 13 prior to performing the force interpolation calculations. The imaginary component of this complex product may be discarded as it equals zero by definition (for example, as described in "A smooth particle mesh ewald method" by M. B. U. Essmann, L. Perera, J. Chem. Phys, vol. 103, no. 19, pp. 8577-8593, 1995), and the real component is optionally multiplied by −1 depending on the coordinates of the element in the original mesh. The partial forces for every atom are then computed by each node #4 and the results are transmitted back to a central host node #2 where they are summed to produce the total atomic forces.

It should be noted that the modifications made to parallelize the smooth particle mesh Ewald algorithm described above, for use with the VR-3DFFT algorithm, are enabled by the linearity of Step 1 of FIG. 13 as well as the linearity of Step 5 of FIG. 13. These parallelization techniques may also be extended to cover other multidimensional DFT-based algorithms that employ linear operations for initialization of the input dataset and/or linear post-calculations on the transformed output dataset.

Among all prior art methods, when performing multidimensional discrete Fourier transforms in a parallel fashion across a plurality of computing nodes, multidimensional transforms are performed by transforming data along subsets of dimensions in sequence, frequently by invoking one-dimensional transforms along pencils of data. This strategy requires data transpose operations to be performed in between transforms to reorganize input data in a manner that is suitable for performing one-dimensional transforms. This transform process generates many relatively small messages that are exchanged in a many-to-many fashion amongst processors. Furthermore, each processor must perform explicit reordering of data elements by performing multiple non-sequential accesses to memory, which can degrade the performance of modern hierarchical memory systems.

In contrast to prior art, present embodiments can perform discrete multidimensional Fourier transforms of input data with arbitrary dimensions and dimensionality by transforming data along all dimensions concurrently according to a vector of radices. Present embodiments further eliminate costly transpose operations required by prior art methods, thereby reducing the all-to-all communication requirement of multiple, small groups of data elements between computing nodes to pairwise dataset exchanges between groups of computing nodes. Furthermore, prior art methods require data reordering operations during transpose operations that can degrade computing performance due to multiple non-sequential accesses to memory. Present embodiments eliminates this requirement and performs accesses to memory in bursts of contiguous data elements, thereby improving memory performance.

Those skilled in the art will appreciate that in some embodiments, the functionality of devices described herein can be implemented using pre-programmed hardware or firmware elements (e.g., application specific integrated circuits (ASICs), electrically erasable programmable read-only memories (EEPROMs), field-programmable gate arrays (FPGAs), etc.), or other related components. In other embodiments, the functionality of devices described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A device for evaluating a discrete Fourier transform (DFT) of a multidimensional input data set with dimensionality D, wherein D is greater than or equal to two, said device comprising:

at least one computing node enabled to evaluate said DFT on said input data set or a subgroup of said input data set, wherein said subgroup comprises groupings of elements taken from a plurality of selected dimensions of said input data set for subsequent multidimensional DFT operations, wherein said at least one computing node comprises:

at least one re-ordering buffer for aligning operands fetched from said data set or said subgroup for presentation to an arithmetic unit, at least one mechanism for performing arithmetic operations upon data available from several sources, data local to said computing node, data received from other instances of said computing node, said input data set or said subgroup, at least one mechanism for producing constant coefficients according to a schedule determined by dimensions and dimensionality of said input data set or said subgroup, and at least one counter for tracking recursion depth;

at least one partition module enabled to provide elements of said multidimensional input data set and further enabled to partition and distribute elements within said multidimensional input data set to said at least one computing node;

at least one collection module enabled to collect transformed output elements of said multidimensional input data set from said at least one computing node and operate upon the collected transformed output;

an interconnection network that enables each computing node to communicate with different computing nodes at different stages of the computation;

wherein said at least one computing node is enabled to evaluate a discrete Fourier transform (DFT) of said multidimensional input data set when said multidimensional data set is of arbitrary dimensionality D', wherein D' is less than or equal to D with dimensions $N_1 \times N_2 \times \ldots \times N_{D'}$, said at least one computing node further comprising:

a memory device for storage and retrieval of said multidimensional input data set, a control sequencing module that implements said recursion depth counter, a memory access generation module for generating memory accesses, a complex rotation factor module for producing complex rotation factors, an arithmetic module for performing complex additions, subtractions, and multiplications;

wherein said control sequencing module is enabled to:
track a current radix vector recursion depth by at least one counter, a forward DFT transformation mode, a reverse DFT transformation mode, a DIT (Decimation-in-time) DFT transformation strategy, and a DIF (Decimation-in-frequency) DFT transformation strategy, and
produce control outputs for said memory access generation module, said complex rotation factor generation module, and said arithmetic module.

2. A device for evaluating a discrete Fourier transform (DFT) of a multidimensional input data set with dimensionality D, wherein D is greater than or equal to two, said device comprising:
at least one computing node enabled to evaluate said DFT on said input data set or a subgroup of said input data set, wherein said subgroup comprises groupings of elements taken from a plurality of selected dimensions of said input data set for subsequent multidimensional DFT operations, wherein said at least one computing node comprises:
at least one re-ordering buffer for aligning operands fetched from said data set or said subgroup for presentation to an arithmetic unit,
at least one mechanism for performing arithmetic operations upon data available from several sources, data local to said computing node, data received from other instances of said computing node, said input data set or said subgroup,
at least one mechanism for producing constant coefficients according to a schedule determined by dimensions and dimensionally of said input data set or said subgroup, and
at least one counter for tracking recursion depth;
at least one partition module enabled to provide elements of said multidimensional input data set and further enabled to partition and distribute elements within said multidimensional input data set to said at least one computing node;
at least one collection module enabled to collect transformed output elements of said multidimensional input data set from said at least one computing node and operate upon the collected transformed output;
an interconnection network that enables each computing node to communicate with different computing nodes at different stages of the computation;
wherein said at least one computing node is enabled to evaluate a discrete Fourier transform (DFT) of said multidimensional input data set when said multidimensional data set is arbitrary dimensionality D', wherein D' is less than or equal to d with dimensions $N_1 \times N_2 \times \ldots \times N_D$, said at least one computing node further comprising:
a memory device for storage and retrieval of said multidimensional input data set,
a control sequencing module that implements said recursion depth counter,
a memory access generation module for generating memory accesses,
a complex rotation factor module for producing complex rotation factors,
an arithmetic module for performing complex additions, subtractions, and multiplications;
wherein said memory access generation module is enabled to:
issue read requests from said memory device and write requests to said memory device according to a schedule defined by inputs from said control sequencing module,
enumerate a number of input data elements accessed from said memory device via at least one counter, and
generate memory access addresses as a function of said inputs and said counters via a permutation function.

3. The device of claim 2, wherein every element of a radix vector r is a power of 2 and said permutation function is implemented using a plurality of bit-wise permutation networks.

4. The device of claim 2, wherein accesses are performed to satisfy a configurable burst length parameter.

5. The device of claim 4, wherein at least one of a reordering buffer and a register is used to reorder a sequence of said input data elements returned from a single read burst access into a plurality of ordered sequences of said input data elements.

6. The device of claim 4, wherein at least one of a multiplexer and a selection function is used to interleave a plurality of sequences of data elements to form a burst write access.

7. A device for evaluating a discrete Fourier transform (DFT) of a multidimensional input data set with dimensionality D, wherein D is greater than or equal to two, said device comprising:
at least one computing node enabled to evaluate said DFT on said input data set or a subgroup of said input data set, wherein said subgroup comprises groupings of elements taken from a plurality of selected dimensions of said input data set for subsequent multidimensional DFT operations, wherein said at least one computing node comprises:
at least one re-ordering buffer for aligning operands fetched from said data set or said subgroup for presentation to an arithmetic unit,
at least one mechanism for performing arithmetic operations upon data available from several sources, data local to said computing node, data received from other instances of said computing node, said input data set or said subgroup,
at least one mechanism for producing constant coefficients according to a schedule determined by dimensions and dimensionality of said input data set or said subgroup, and
at least one counter for tracking recursion depth;
at least one partition module enabled to provide elements of said multidimensional input data set and further enabled to partition and distribute elements within said multidimensional input data set to said at least one computing node;
at least one collection module enabled to collect transformed output elements of said multidimensional input data set from said at least one computing node and operate upon the collected transformed output;
an interconnection network that enables each computing node to communicate with different computing nodes at different stages of the computation;
wherein said at least one computing node is enabled to evaluate a discrete Fourier transform (DFT) of said multidimensional input data set when said multidimensional data set is of arbitrary dimensionality D', wherein D' is less than or equal to D with dimensions $N_1 \times N_2 \times \ldots \times N_D$, said at least one computing node further comprising:
a memory device for storage and retrieval of said multidimensional input data set,
a control sequencing module that implements said recursion depth counter,
a memory access generation module for generating memory accesses, a complex rotation factor module for producing complex rotation factors, an arithmetic module for performing complex additions, subtractions, and multiplications;

wherein said complex rotation factor module is enabled to produce an ordered sequence of factors base on at least one counter to enumerate coordinates of data elements and inputs from said control sequencing module;

wherein a table of pre-computed rotation factors is indexed by a function of said at least one recursion counter and inputs to produce an appropriate rotation factor; and wherein every element of a radix vector r is a power of 2 and said a function of said at least one recursion counter is implemented using shifters and modulo arithmetic.

8. A device for evaluating a discrete Fourier transform (DFT) of a multidimensional input data wet with dimensionality D, wherein D is greater than or equal to two, said device comprising:

at least one computing node enabled to evaluate said DFT on said input data set or a subgroup of said input data set, wherein said subgroup comprises groupings of elements taken from a plurality of selected dimensions of said input data set for subsequent multidimensional DFT operations, wherein said at least one computing node comprises:

at least one re-ordering buffer for aligning operands fetched from said data set or said subgroup for presentation to an arithmetic unit, at least one mechanism for performing arithmetic operations upon data available from several sources, data local to said computing node, data received from other instances of said computing node, said input data set or said subgroup, at least one mechanism for producing constant coefficients according to a schedule determined by dimensions and dimensionality of said input data set or said subgroup, and at least one counter for tracking recursion depth;

at least one partition module enabled to provide elements of said multidimensional input data set and further enabled to partition and distribute elements within said multidimensional input data set to said at least one computing node;

at least one collection module enabled to collect transformed output elements of said multidimensional input data set from said at least one computing node and operate upon the collected transformed output;

an interconnection network that enables each computing node to communicate with different computing nodes at different stages of the computation;

wherein said at least one computing node is enabled to evaluate a discrete Fourier transform (DFT) of said multidimensional input data set when said multidimensional data set is of arbitrary dimensionality D', wherein D' is less than or equal to D with dimensions $N_1 \times N_2 \times \ldots \times N_D$, said at least one computing node further comprising:

a memory device for storage and retrieval of said multidimensional input data set, a control sequencing module that implements said recursion depth counter, a memory access generation module for generating memory accesses, a complex rotation module for producing complex rotation factors, an arithmetic module for performing complex additions, subtractions, and multiplications;

wherein independent subgroups of said multidimensional input data are distributed across a plurality of computing nodes including said at least one computing node; and wherein said plurality of computing nodes are enabled to exchange said subgroups of multidimensional data among each other in a manner corresponding to repeatedly dividing said plurality of computing nodes into two groups of computing nodes and forming pairs of computing nodes by choosing exactly one computing node from each group and permitting said subgroups of multidimensional data to be exchanged between said computing nodes of said pairs.

9. The device of claim 8, wherein said two groups of computing nodes and said pairs of said computing nodes are chosen according to a radix vector r.

10. A device for evaluating a discrete Fourier transform (DFT) of a multidimensional input data set with dimensionality D, wherein D is greater than or equal to two, said device comprising:

at least one computing node enabled to evaluate said DFT on said input data set or a subgroup of said input data set, wherein said subgroup comprises groupings of elements taken from a plurality of selected dimensions of said input data set for subsequent multidimensional DFT operations, wherein said at least one computing node comprises:

at least one re-ordering buffer for aligning operands fetched from said data set or said subgroup for presentation to an arithmetic unit, at least one mechanism for performing arithmetic operations upon data available from several sources, data local to said computing node, data received from other instances of said computing node, said input data set or said subgroup, at least one mechanism for producing constant coefficients according to a schedule determined by dimensions and dimensionality of said input data set or said subgroup, and at least one counter for tracking recursion depth;

at least one partition module enabled to provide elements of said multidimensional input data set and further enabled to partition and distribute elements within said multidimensional input data set to said at least one computing node;

at least one collection module enabled to collect transformed output elements of said multidimensional input data set from said at least one computing node and operated upon the collected transformed output;

an interconnection network that enables each computing node to communicate with different computing nodes at different stages of the computation;

wherein said at least one computing node is enabled to evaluate a discrete Fourier transform (DFT) of said multidimensional input data set when said multidimensional data set is of arbitrary dimensionality D', wherein D' is less than or equal to D with dimensions $N_1 \times N_2 \times \ldots \times N_D$, said at least one computing node further comprising:

a memory device for storage and retrieval of said multidimensional input data set, a control sequencing module that implements said recursion depth counter, a memory access generation module for generating memory accesses, a complex rotation factor module for producing complex rotation factors, an arithmetic module for performing complex additions, subtractions, and multiplications;

wherein a radix vector r changes according to a recursion depth and dimensions of said multidimensional input data set.

11. A device for evaluating a discrete Fourier transform (DFT) of a multidimensional input data set with dimensionality D, wherein D is greater than or equal to two, said device comprising:

at least one computing node enabled to evaluate said DFT on said input data set or a subgroup of said input data set, wherein said subgroup comprises groupings of elements taken from a plurality of selected dimensions of said input data set for subsequent multidimensional DFT operations, wherein said at least one computing node comprises:

at least one re-ordering buffer for aligning operands fetched from said data set or said subgroup for presentation to an arithmetic unit, at least one mechanism for performing arithmetic operations upon data available from several sources, data local to said computing node, data received from other instances of said computing node, said input data set or said subgroup, at least one mechanism for producing constant coefficients according to a schedule determined by dimensions and dimensionality of said input data set or said subgroup, and at least one counter for tracking recursion depth;

at least one partition module enabled to provide elements of said multidimensional input data set and further enabled to partition and distribute elements within said multidimensional input data set to said at least one computing node;

at least one collection module enabled to collect transformed output elements of said multidimensional input data set from said at least one computing node and operated upon the collected transformed output;

an interconnection network that enables each computing node to communicate with different computing nodes at different stages of the computation;

wherein said at least one computing node is enabled to evaluate a discrete Fourier transform (DFT) of said multidimensional input data set when said multidimensional data set is of arbitrary dimensionality D', wherein D' is less than or equal to D with dimensions $N_1 \times N_2 \times \ldots \times N_D$, said at least one computing node further comprising:

a memory device for storage and retrieval of said multidimensional input data set, a control sequencing module that implements said recursion depth counter, a memory access generation module for generating memory accesses, a complex rotation factor module for producing complex rotation factors, an arithmetic module for performing complex additions, subtractions, and multiplications;

at least one additional module for evaluating a smooth particle mesh Ewald calculation;

an initializing module for initializing a charge mesh stored in said memory device based on a dataset comprising atomic coordinates and atomic charges;

a Gaussian module for at least one of storage and generation of a Gaussian charge-spreading dataset;

a point-wise module for performing point-wise multiplications of said Gaussian charge-spreading dataset with contents of said memory device and summing potential energies; and a force calculation module for calculating interatomic forces using a transformed charge mesh.

12. The device of claim 11, wherein initialization of said charge mesh is performed in parallel local to said compute nodes by spatially subdividing simulation volumes and distributing the atom coordinates and charges to corresponding compute nodes.

13. The device of claim 11 wherein calculation of said interatomic forces is performed in parallel and local to said at least one computing node using transformed charge meshes generated using spatially-subdivided groups of said atomic coordinates and said atomic charges.

14. The device of claim 11, wherein initialization of said charge mesh is performed by using coordinates and charges of every atom in a simulation volume and performing a complex rotation on every element generated by said initializing module prior to linear superposition of the modified element onto said local charge mesh, thereby eliminating communication between computing nodes in an initial decimation-in-frequency DFT operation.

15. The device of claim 11, wherein said calculation of said interatomic forces is performed locally by:

performing a complex rotation upon every element of said transformed charge mesh, which is generated using coordinates and charges of every atom in a simulation volume; and inputting rotated elements of said transformed charge mesh into said force calculation module to produce partial forces for every atom in said simulation volume, thereby eliminating communication between computing nodes in a final decimation-in-time DFT operation.

16. A device for evaluating a discrete Fourier transform (DFT) of a multidimensional input data set with dimensionality D, wherein D is greater than or equal to two, said device comprising:

at least one computing node enabled to evaluate said DFT on said input data set or a subgroup of said input data set, wherein said subgroup comprises groupings of elements taken from a plurality of selected dimensions of said input data set for subsequent multidimensional DFT operations, wherein said at least one computing node comprises:

at least one re-ordering buffer for aligning operands fetched from said data set or said subgroup for presentation to an arithmetic unit, at least one mechanism for performing arithmetic operations upon data available from several sources, data local to said computing node, data received from other instances of said computing node, said input data set or said subgroup, at least one mechanism for producing constant coefficients according to a schedule determined by dimensions and dimensionality of said input data set or said subgroup, and at least one counter for tracking recursion depth;

at least one partition module enabled to provide elements of said multidimensional input data set and further enabled to partition and distribute elements within said multidimensional input data set to said at least one computing node;

at least one collection module enabled to collect transformed output elements of said multidimensional input data set from said at least one computing node and operated upon the collected transformed output;

an interconnection network that enables each computing node to communicate with different computing nodes at different stages of the computation;

wherein said at least one computing node is enabled to evaluate a discrete Fourier transform (DFT) of said multidimensional input data set when said multidimensional data set is of arbitrary dimensionality D', wherein D' is less than or equal to D with dimensions $N_1 \times N_2 \times \ldots \times N_D$, said at least one computing node further comprising:

a memory device for storage and retrieval of said multidimensional input data set, a control sequencing module that implements said recursion depth counter, a memory access generation module for generating memory accesses, a complex rotation factor module for producing complex rotation factors, an arithmetic module for performing complex additions, subtractions, and multiplications; and a linear post-DFT calculation mechanism for operating upon transformed output data to produce portions of a collection of output values, wherein said linear post-DFT calculation mechanism is replicated for each instance of said at least one computing node and said at least one collection module is enabled to gather portions of said collection of output values from appropriate computing nodes and merge said portions into a complete collection, thereby reducing execution time of a post-DFT calculation mechanism.

17. A device for evaluating a discrete Fourier transform (DFT) of a multidimensional input data set with dimensionality D, wherein D is greater than or equal to two, said device comprising:

at least one computing node enabled to evaluate said DFT on said input data set or a subgroup of said input data set, wherein said subgroup comprises groupings of elements taken from a plurality of selected dimensions of said input data set for subsequent multidimensional DFT operations, wherein said at least one computing node comprises:

at least one re-ordering buffer for aligning operands fetched from said data set or said subgroup for presentation to an arithmetic unit, at least one mechanism for performing arithmetic operations upon data available from several sources, data local to said computing node, data received from other instances of said computing node, said input data set or said subgroup, at least one mechanism for producing constant coefficients according to a schedule determined by dimensions and dimensionality of said input data set or said subgroup, and at least one counter for tracking recursion depth;

at least one partition module enabled to provide elements of said multidimensional input data set and further enabled to partition and distribute elements within said multidimensional input data set to said at least one computing node;

at least one collection module enabled to collect transformed output elements of said multidimensional input data set from said at least one computing node and operated upon the collected transformed output;

an interconnection network that enables each computing node to communicate with different computing nodes at different stages of the computation;

wherein said at least one computing node is enabled to evaluate a discrete Fourier transform (DFT) of said multidimensional input data set when said multidimensional data set is of arbitrary dimensionality D', wherein D' is less than or equal to D with dimensions $N_1 \times N_2 \times \ldots \times N_D$, said at least one computing node further comprising:

a memory device for storage and retrieval of said multidimensional input data set, a control sequencing module that implements said recursion depth counter, a memory access generation module for generating memory accesses, a complex rotation factor module for producing complex rotation factors, an arithmetic module for performing complex additions, subtractions, and multiplications;

a linear mechanism for initializing said multidimensional input data set based on a collection of input values, wherein:

said linear mechanism is replicated for each instance of said at least one computing node, said at least one partition module is modified to transmit said collection of input values to every instance of said at least one computing node, and said arithmetic module is enabled to perform a complex rotation of all data elements produced by said linear mechanism prior to linear superposition of modified data elements onto the dataset belonging to said at least one computing node, thereby reducing a computation time of said device by eliminating communication between computing nodes.

18. A device for evaluating a discrete Fourier transform (DFT) of a multidimensional input data set with dimensionality D, wherein D is greater than or equal to two, said device comprising:

at least one computing node enabled to evaluate said DFT on said input data set or a subgroup of said input data set, wherein said subgroup comprises groupings of elements taken from a plurality of selected dimensions of said input data set for subsequent multidimensional DFT operations, wherein said at least one computing node comprises:

at least one re-ordering buffer for aligning operands fetched from said data set or said subgroup for presentation to an arithmetic unit, at least one mechanism for performing arithmetic operations upon data available from several sources, data local to said computing node, data received from other instances of said computing node, said input data set or said subgroup, at least one mechanism for producing constant coefficients according to a schedule determined by dimensions and dimensionality of said input data set or said subgroup, and at least one counter for tracking recursion depth;

at least one partition module enabled to provide elements of said multidimensional input data set and further enabled to partition and distribute elements within said multidimensional input data set to said at least one computing node;

at least one collection module enabled to collect transformed output elements of said multidimensional input data set from said at least one computing node and operated upon the collected transformed output;

an interconnection network that enables each computing node to communicate with different computing nodes at different stages of the computation;

wherein said at least one computing node is enabled to evaluate a discrete Fourier transform (DFT) of said multidimensional input data set when said multidimensional data set is of arbitrary dimensionality D', wherein D' is less than or equal to D with dimensions $N_1 \times N_2 \times \ldots \times N_D$, said at least one computing node further comprising:

a memory device for storage and retrieval of said multidimensional input data set, a control sequencing module that implements said recursion depth counter, a memory access generation module for generating memory accesses, a complex rotation factor module for producing complex rotation factors, an arithmetic module for performing complex additions, subtractions, and multiplications;

a linear post-DFT calculation mechanism for operating upon transformed output data to produce a collection of output values, wherein:

said linear post-DFT calculation mechanism is replicated for each instance of said at least one computing node;

said arithmetic module is enabled to perform a complex rotation of all transformed output data elements belonging to said at least one computing node prior to inputting transformed output data elements to said linear post-DFT calculation mechanism; and said at least one collection module is enabled to gather said collection of output values produced by said computing nodes and merge them using a linear operation, thereby reducing a computation time of said device by eliminating the communication between computing nodes.

* * * * *